US005859179A

United States Patent [19]
Chou

[11] Patent Number: 5,859,179
[45] Date of Patent: Jan. 12, 1999

[54] FORMING SUPERABSORBENT POLYMER

[75] Inventor: Yueting Chou, Chesterfield, Mo.

[73] Assignee: Solutia Inc., St. Louis, Mo.

[21] Appl. No.: 819,431

[22] Filed: Mar. 17, 1997

[51] Int. Cl.$^6$ ................................................. C08G 69/10
[52] U.S. Cl. ........................ 528/328; 528/310; 528/335; 528/336; 528/363; 521/64; 521/183; 521/184
[58] Field of Search .................... 528/328, 310, 528/335, 336, 363; 521/64, 183, 184

[56] References Cited

U.S. PATENT DOCUMENTS

| | | | |
|---|---|---|---|
| 4,332,928 | 6/1982 | Kluger et al. | 528/113 |
| 4,434,228 | 2/1984 | Swann | 435/108 |
| 4,556,689 | 12/1985 | Murakami et al. | 525/54.1 |
| 4,803,168 | 2/1989 | Jarvis, Jr. | 435/240.22 |
| 5,057,597 | 10/1991 | Koskan | 528/328 |
| 5,062,980 | 11/1991 | Migdal et al. | 252/51.5 |
| 5,142,062 | 8/1992 | Knebel et al. | 548/545 |
| 5,247,068 | 9/1993 | Donachy et al. | 530/350 |
| 5,284,936 | 2/1994 | Donachy et al. | 530/350 |
| 5,315,010 | 5/1994 | Koskan et al. | 548/520 |
| 5,319,145 | 6/1994 | Paik et al. | 528/328 |
| 5,461,085 | 10/1995 | Nagatomo et al. | 521/183 |
| 5,478,919 | 12/1995 | Koskan et al. | 528/363 |
| 5,484,945 | 1/1996 | Nagatomo et al. | 548/520 |
| 5,525,682 | 6/1996 | Nagatomo et al. | 525/420 |
| 5,525,703 | 6/1996 | Kalota | 528/363 |
| 5,552,516 | 9/1996 | Ross et al. | 528/363 |
| 5,552,517 | 9/1996 | Martin | 528/363 |
| 5,612,384 | 3/1997 | Ross et al. | 521/64 |
| 5,650,270 | 7/1997 | Giese et al. | 435/6 |

FOREIGN PATENT DOCUMENTS

| | | |
|---|---|---|
| 0387346 | 6/1995 | European Pat. Off. . |
| 0658586 | 6/1995 | European Pat. Off. . |
| 0683231 | 11/1995 | European Pat. Off. . |
| 0693557 | 1/1996 | European Pat. Off. . |

OTHER PUBLICATIONS

Journal of Controlled Release, 29(1994) 63–72 "A New Water–Soluble Synthetic Polymer, α, β–Polysparthydrazide, as Potential Plasma Expander and Drug Carrier", 1994 Elsevier Science B.V. by G. Giammona, et al.

Journal of Bioactive and Compatible Polymers, pp. 28–40, vol. 10—Jan. 1995 "Crosslinked α,β–Polyasparthydrazide Micromatrices for Controlled Release of Anticancer Drugs" by G. Giammona, et al., Colloid & Polymer Science, 272:1637–1641 (1994) "Synthesis and Characterization of Water–Swellable α,β–Polyasparthydrazide Derivatives" by G. Giammona, et al.

Journal of Controlled Release, Official Journal of the Controlled Release Society, 1966 vol. 41 Issues 1 and 2, p. 195–203, Accepted Dec. 8, 1995 "Crosslinked α,β–Polyasparthydrazide Hydrogels: Effect of Crosslinking Degree and Loading Method on Cytarabine Release Rate" by G. Giammona, et al.

Mat. Res. Soc. Symp. Proc., vol. 292, 1993 Materials Research Society, pp. 277–283, "Large Scale Thermally Synthesized Polyaspartate as a Biodegradable Substitute in Polymer Applications" by A.P. Wheeler and L.P. Koskan.

Journal of Polymer Science, Polymer Letters Edition, Dec. 1982, vol. 20, No. 12, pp. 621–627, "Addition Polyimides. II. Polyaspartimide Oligomers" by John Wiley & Sons, Inc., by I.K. Varma, et al.

Bollettino Chimico Farmaceutico, Fondato da P. Viscardi nel 1861, Rivista di Scienze Farmaceutiche e Biologiche, 1993 vol. 132 Issue 2, 2 Febbraio 1993, "Forza Di Rigonfiamento E Proprieta Di Derivati Polisuccinimmidici" by G. Massimo [Translation: Massimo et al., Swelling Force and Properties of Polysuccinimide Derivatives, *Boll. Chim. Farm.* (1993), 123(2) pp. 43–44].

*Primary Examiner*—Duc Truong
*Attorney, Agent, or Firm*—Fitzpatrick, Cella, Harper & Scinto

[57] ABSTRACT

A method of preparing superabsorbent polymer as crosslinked polyaspartate salt by reacting polysuccinimide dissolved in organic solvent with crosslinker and reacting the polysuccinimide in situ with neat or a solution of alkali metal hydroxide to form the crosslinked salt.

13 Claims, No Drawings

FORMING SUPERABSORBENT POLYMER

BACKGROUND OF THE INVENTION

This invention relates to polyaspartate salt and more particularly to process improvements for preparing such polymer.

Crosslinked hydrolyzed polymers of L-aspartic acid are disclosed as superabsorbent polymers in U.S. Pat. Nos. 5,461,085 to Nagatomo et al and 5,525,703 to Kalota. L-aspartic acid is thermally polycondensed to polysuccinimide (PSI) and then dissolved in organic solvent or suspended in water and crosslinked by adding crosslinking agent to the solution or suspension. The product of the crosslinking reaction is then hydrolyzed, typically using aqueous caustic. According to these prior art patents, when PSI is crosslinked in organic solvent, it is first isolated before subjecting to aqueous hydrolysis. Improvements are continuously sought in simplifying processes for forming these industrially important products.

SUMMARY OF THE INVENTION

Now, such improvements have been made in processes for forming hydrolyzed crosslinked PSI useful as superabsorbent polymer.

Accordingly, a principal object of this invention is to improve the process for forming base-hydrolyzed crosslinked PSI.

Another object is to provide an improvement in the hydrolysis step of a process wherein PSI is crosslinked in solution.

Other objects will in part be obvious and will in part appear from the following description and claims.

These and other objects are accomplished by hydrolyzing the product of solution-crosslinked PSI in situ—i.e. without first isolating the PSI.

More particularly, a method is provided for preparing crosslinked polyaspartate salt which comprises i) reacting polysuccinimide dissolved in organic solvent with crosslinker to form crosslinked polysuccinimide and ii) reacting the polysuccinimide of i) in situ with neat or a concentrated solution of alkali metal or alkaline earth metal (e.g. Ca, Mg) or ammonium hydroxide to form the crosslinked salt.

In another aspect, a crosslinkable, hydrolyzable composition is provided comprising PSI dissolved in organic solvent, crosslinker for PSI and metal hydroxide in neat form or aqueous solution.

Further provided in the process for preparing crosslinked polyaspartate salt by hydrolyzing polysuccinimide crosslinked in an organic solvent reaction medium, is the improvement wherein hydrolysis occurs in situ in the organic solvent reaction medium.

DETAILED DESCRIPTION OF THE INVENTION

According to the invention, base-hydrolysis of crosslinked PSI is carried out without isolation from and in the same reaction medium (in situ) as where solution crosslinking of uncrosslinked PSI occurs. This simplified process for preparing the crosslinked polymer salt avoids isolating unhydrolyzed crosslinked PSI solid intermediate from solution before conducting hydrolysis. Preferably crosslinking and hydrolysis are carried out sequentially in the organic solvent reaction medium. Depending on choice of crosslinker, if crosslinking rate is relatively fast relative to hydrolysis, crosslinking and hydrolysis can be conducted simultaneously in and starting with a crosslinkable, hydrolyzable composition of dissolved PSI, crosslinker and base.

Polysuccinimide polymers to be crosslinked are prepared by known means such as described in U.S. Pat. Nos. 5,057,597, 5,315,010; 5,319,145; 5,142,062; and 5,484,945, the disclosures of which are incorporated herein by reference. In the systems disclosed in these patents, reactors of various types and processes are used to convert L-aspartic acid to PSI by thermal condensation. Catalysts such as phosphoric acid may be employed to reduce reaction time to condense the L-aspartic acid as it is heated while continuously removing water in known manner. After preparation, the preformed PSI is then dissolved in organic solvent in preparation for solution crosslinking. The homogeneous solution of dissolved PSI (as opposed to a heterogeneous mixture) promotes crosslinking efficiency and eventual superabsorbing performance of the polymer.

Any organic solvent capable of substantially dissolving PSI is usable. Preferred solvents are highly polar such as dimethyl formamide. Others include dimethyl sulfoxide, dimethyl acetamide, N-methyl-pyrrolidinone, sulfolane and the like.

Any crosslinking agent can be used which contains at least 2 groups, which are identical or different, and are functionally effective to crosslink succinimide groups of PSI. For example, both such groups are amino in 1,6 hexamethylene diamine but are different in 4-aminobenzamidine where one is amino and the other amidine. Preferred crosslinking agents include polyamines having 2 or more primary or secondary amino groups. Preferred polyamines include 1,6 hexamethylene diamine and 4-aminomethyl-1,8 diaminooctane (triaminononane). Others include hydrazine, polyhydrazine and polyhydrazide.

The amount of crosslinking agent used is sufficient to provide superabsorbing properties to the polymer product, which is generally from about 0.01 to about 0.2 moles crosslinker per mole PSI.

The base used in hydrolysis may be solid (e.g. substantially (less than 15 weight % moisture) anhydrous) dilute or concentrated by which is meant at least 50% in aqueous solution. The base is alkali or alkaline earth (e.g. Ca or Mg) metal hydroxide or ammonium hydroxide. Concentrated sodium or potassium hydroxide is preferred. The hydrolysis reaction opens succinimide rings which have not been reacted with crosslinker. Such reaction is carried out at a temperature from about room (25° C.) to about 50° C. Keeping the temperature within this range minimizes side reaction(s) from the base and organic solvent.

The invention is further described in the following Examples which are not intended to limit or restrict the invention. Unless otherwise indicated all quantities are expressed in weight.

The tea bag test measuring superabsorbence referred to in the Examples is conducted as follows: 0.2 gm of a sample is placed in a tea bag-like pouch (2"X2") of nonwoven fabric and heat sealed. The tea bag is subjected to a 15 second immersion in a 0.9% saline solution, one minute drip dry and weighing, followed by a 2 min. 45 sec. immersion, one min. drip dry and weighing, and then an additional 7 min. immersion, one min. drip dry and weighing. The absorbencies for 15 seconds, 3 minutes and 10 minutes are calculated according to the following equation and the 10 min. value reported as superabsorbing performance. Absorbency in gm/gm=(weight of the tea bag with treated sample minus weight of a wet empty tea bag)/0.2 gm.

EXAMPLE 1

To a 250 ml 4-neck round-bottomed flask equipped with mechanical stirrer, thermometer, addition funnel and heating mantle are charge 15 gm (0.1546 mole) of polysuccinimide with a molecular weight of 80,000 determined by gel permeation chromatography and 95 ml dimethyl formamide (DMF). The flask contents are heated to 50° C. with agitation to ensure dissolution. 2.7 gm (0.0232 mole) 1,6 hexane diamine in 20 ml DMF is added at room temperature and held at room temperature for one hour and then 100 ml DMF is further added to dilute the gel in the flask. The diluted gel is divided into 2 halves.

The first half is placed in a 400 ml beaker equipped with mechanical stirrer, thermometer and hot plate. About 3.5 ml 50% NaOH solution is slowly pumped into the gel at room temperature over about 20 minutes. The mixture is heated to and held at 50° C. for 2 hours. The slurry is cooled, filtered and washed with methanol. Some solid product passes through the filter and is not recovered. The wet cake is dried in a vacuum oven to produce 6.5 gm of superabsorbent polymer.

EXAMPLE 2 (CONTROL)

The second half of the crosslinked PSI/DMF mixture from Example 1 is vacuum evaporated to yield 10.28 gm intermediate flakes (may still contain trace DMF). 4 gm of the intermediate is suspended in 100 ml of water in a 400 ml beaker equipped with mechanical stirrer, thermometer and hot plate. At 58° C., 11.55 ml 10% NaOH is gradually pumped into the system while controlling pH at between 10.8 and 11.0. After caustic addition, the gel formed is held at 60° C. for two more hours and then concentrated by filtration. It is treated with methanol and the precipitate isolated to yield 3.6 gm of superabsorbent polymer.

EXAMPLE 3

The crosslinking procedure of Example 1 is repeated except using 1.80 gm (10 mole %) of 1,6 hexane diamine crosslinker. About 7.6 gm of superabsorbent polymer is obtained by in situ hydrolysis of the first half of the diluted crosslinked gel.

EXAMPLE 4 (CONTROL)

The hydrolysis procedure of Example 2 is repeated on the second half of the diluted crosslinked gel of Example 3. 4.3 gm of superabsorbent product is collected.

EXAMPLE 5

To a 500 ml 4-necked round-bottomed flask equipped with mechanical stirrer, thermometer, addition funnel and heating mantle is charged 15.0 gm (0.1546 mole) of polysuccinimide with a molecular weight of 80,000 and 200 ml DMF. The flask contents are heated to 50° C. with agitation. 1.8 gm (0.0155 mole) 1,6 hexane diamine in 20 ml DMF is added at room temperature over 30 minutes and held at room temperature for one hour and then 150 ml DMF is further added to dilute the gel in the flask. The diluted gel is again divided into 2 halves.

The first half of the mixture of crosslinked PSI in DMF is charged to a 500 ml flask equipped with mechanical stirrer, thermometer and heating mantle. About 2.6 gm of a freshly milled sodium hydroxide powder is added to the gel at room temperature over about 20 minutes. The mixture is heated to 50° C. and held at that temperature for 3.5 hours. The slurry is cooled, filtered and washed with methanol. Some product passing through the filter is recovered by evaporation. The wet cake collected is dried in a vacuum oven to provide about 10.1 gm of superabsorbent polymer.

EXAMPLE 6 (CONTROL)

The procedure of Example 4 is repeated on the second half of the crosslinked mixture of Example 5 to provide 4.3 gm of superabsorbent product.

Absorption performance of the polymers of Examples 1–6 in the tea bag test is shown in the following table.

| Example | Crosslinker to PSI ratio (%) | Medium for hydrolysis | Conc. (%) of NaOH used | Tea bag Absorbancy H2O/0.9% Saline |
|---|---|---|---|---|
| 1 | 15 | DMF | 50 | 23/14 |
| 2 (control) | 15 | water | 10 | 28/20 |
| 3 | 10 | DMF | 50 | 21/14 |
| 4 (control) | 10 | water | 10 | 15/15 |
| 5 | 10 | DMF | 98.4 (neat) | 8/7 |
| 6 (control) | 10 | water | 10 | 29/16 |

The above data illustrates superabsorbence of crosslinked polyaspartate salt formed by in situ hydrolysis of crosslinked PSI in a medium such as DMF solvent in comparison with performance where the crosslinked PSI was first isolated before hydrolysis in water (Exs. 2,4,6). The result in Ex. 5 using neat caustic supports preference for use of a solution of base as in Examples 1 and 3.

The preceding description is for illustration and should not be taken as limiting. Various modifications and alterations will be readily suggested to persons skilled in the art. It is intended, therefore, that the foregoing be considered as exemplary only and that the scope of the invention be ascertained from the following claims.

I claim:

1. A method of preparing crosslinked polyaspartate salt which comprises:
   i) reacting polysuccinimide dissolved in organic solvent with crosslinker to form crosslinked polysuccinimide; and
   ii) reacting the polysuccinimide of i) in situ with neat or a concentrated solution of alkali metal, alkaline earth metal or ammonium hydroxide to form the crosslinked salt.

2. The method of claim 1 wherein the crosslinker is polyamine.

3. The method of claim 2 wherein the polyamine is hexamethylene diamine.

4. A method of preparing solid crosslinked polyaspartate salt which comprises:
   i) dissolving polysuccinimide in organic solvent;
   ii) reacting the dissolved polysuccinimide with crosslinker; and then
   iii) hydrolyzing the reaction product of ii) in situ to form the precipitated salt; and then
   iv) isolating the precipitated solid salt from the organic solvent.

5. The method of claim 4 wherein hydrolysis occurs using neat alkaline earth metal hydroxide.

6. The method of claim 4 wherein hydrolysis occurs using an aqueous solution of alkali metal hydroxide.

7. The method of claim 4 wherein step ii) occurs by adding a solution of crosslinker to the polysuccinimide solution.

8. The method of any of claims 4, 5, 6 or 7 wherein the crosslinker is polyamine.

9. The method of claim 8 wherein the polyamine is triaminononane or hexamethylene diamine.

10. The method of claim 9 wherein the crosslinker is hexamethylene diamine.

11. A crosslinkable, hydrolyzable composition comprising:
    i) polysuccinimide (PSI) dissolved in organic solvent;
    ii) crosslinker for PSI; and
    iii) metal hydroxide in neat form or as aqueous solution.

12. The composition of claim 11 wherein the metal hydroxide is a caustic solution containing at least 50 weight % sodium or potassium hydroxide.

13. In the process for preparing crosslinked polyaspartate salt or acid by hydrolyzing polysuccinimide crosslinked in an organic solvent reaction medium, the improvement wherein hydrolysis occurs in situ in the organic solvent reaction medium.

* * * * *